United States Patent [19]

Hamada et al.

[11] Patent Number: 5,320,380

[45] Date of Patent: Jun. 14, 1994

[54] COVER FOR AN AIRBAG ASSEMBLY

[75] Inventors: Shinji Hamada; Masayoshi Chihaya, both of Kanagawa, Japan

[73] Assignee: Ikeda Bussan Co., Ltd., Ayase, Japan

[21] Appl. No.: 765,235

[22] Filed: Sep. 25, 1991

[30] Foreign Application Priority Data

Sep. 28, 1990 [JP] Japan .................. 2-259508

[51] Int. Cl.⁵ .................................... B60R 21/16
[52] U.S. Cl. .................................... 280/728 B
[58] Field of Search ............... 280/728, 730, 731, 732, 280/743, 728 B, 728 R, 730 R

[56] References Cited

U.S. PATENT DOCUMENTS

| | | | |
|---|---|---|---|
| 3,622,176 | 11/1971 | Byer | 280/732 |
| 4,148,503 | 4/1979 | Shiratori et al. | 280/731 |
| 4,752,083 | 6/1988 | Honda | 280/731 |
| 4,842,300 | 6/1989 | Ziomek | 280/732 |
| 4,989,897 | 2/1991 | Takada | 280/743 |
| 5,060,971 | 10/1991 | Nanbu et al. | 280/728 B |
| 5,110,647 | 5/1992 | Sawada et al. | 280/743 |

FOREIGN PATENT DOCUMENTS

| | | | |
|---|---|---|---|
| 3043077 | 6/1982 | Fed. Rep. of Germany | 280/728 |
| 56-43890 | 10/1981 | Japan. | |
| 61-185642 | 11/1986 | Japan. | |
| 1-109146 | 4/1989 | Japan. | |

*Primary Examiner*—Karin L. Tyson
*Attorney, Agent, or Firm*—Foley & Lardner

[57] ABSTRACT

An airbag restraint system for protecting a vehicle passenger in the event of a vehicle serious collision. An airbag of this system is usually folded compactly and is covered with a generally box-shaped cover member. The cover member has openings at the central portion and the side center portion of a rectangular top surface of the cover member. A plurality of thin portions, which are thinner in thickness than that of the main portion, are formed along the center line parallel to the long side of the top surface and along every sides of the top surface. In the event of the vehicle serious collision, the cover member is easily broken from the end of the thin portion defining the opening.

10 Claims, 2 Drawing Sheets

COVER FOR AN AIRBAG ASSEMBLY

BACKGROUND OF THE INVENTION

1. Field of the Invention

The present invention relates to improvements during an airbag restraint system for protecting a vehicle passenger in a vehicle serious collision or the like, and more particularly to a configuration of a cover member for a folded airbag.

2. Description of the Prior Art

Hitherto a variety of airbag restraint systems for automotive vehicles have been proposed and put into practical use in order to protect a vehicle passenger in the event of a vehicle serious collision or the like. Such airbag restraint systems are disclosed, for example, in Japanese Patent Publication No. 56-43890 and Japanese Utility Model Provisional Publication No. 61-185642.

The airbag restraint system includes an airbag which is momentarily inflated by being filled with gas from a gas generator. The airbag and the gas generator are fixedly connected to a base plate which is secured to a part of a vehicular body such as an instrument panel or steering wheel. The airbag has a gas passage through which gas from the gas generator is flowed in the airbag. The airbag is usually folded and covered with a cover member made of a plastic so that the airbag does not contact the vehicular body such as a part of the instrumental panel. The peripheral end portion of the cover member is fixedly secured to the end portion of the base plate with rivets or blots. The upper surface of the cover member is formed to be broken at its thin part in the event of the inflation of the airbag so that the airbag is smoothly inflated.

However, difficulties have been encountered in the conventional airbag restraint system, in that the cover member tends to be broken at its peripheral portion which is secured to the base plate by rivets while also being broken at its thin portion in the event of the inflation of the airbag. This causes a problem in that the cover member is broken into several pieces which are scattered in various directions. In order to prevent the cover member from being scattered as mentioned above, another system is disclosed, for example, in Japanese Patent Provisional Publication No. 1-109146. In this system, in order to prevent a cover member from breaking away from a base plate, the cover member is bulged at its periphery and is put between the base plate and a reinforcing plate at an inner side portion of the bulged end while being secured with rivets. However, this system is not sufficient in strength in the event of the inflation of the airbag body since the bulged end is free and tends to be deformed.

SUMMARY OF THE INVENTION

It is an object of the present invention to provide an improved airbag restraint system in which a cover member is properly broken without getting out from the base plate in the event of the inflation of an airbag.

Another object of the present invention is to provide an improved airbag restraint system with which a safety installation structure is realized without increasing a number of rivets upon improving an assembly operation.

An airbag restraint system according to the present invention comprises a base plate and a generator which is secured to the base plate. An airbag is secured to the base plate and is fluidly connected with to gas generator so as to be supplied with gas from the gas generator. A cover member covers the airbag when the airbag is folded, and is formed in a generally box shape with a cover base of a surrounding wall portion and a cover top of a rectangular plate. The cover member is secured at its peripheral portion to the base plate and defines a first opening at the central portion of the cover top and a second opening at a center portion of the short side of the cover top.

With this arrangement, since the openings are formed at the center portion of the cover top and the center portion of the short side of the cover top, the cover member is easily broken by splitting from the opening defining portion in the event of the inflation of the airbag. Accordingly, this airbag restraint system according to the present invention provides an excellent safety for a vehicle passenger.

DETAILED DESCRIPTION OF THE INVENTION

Figure 1:
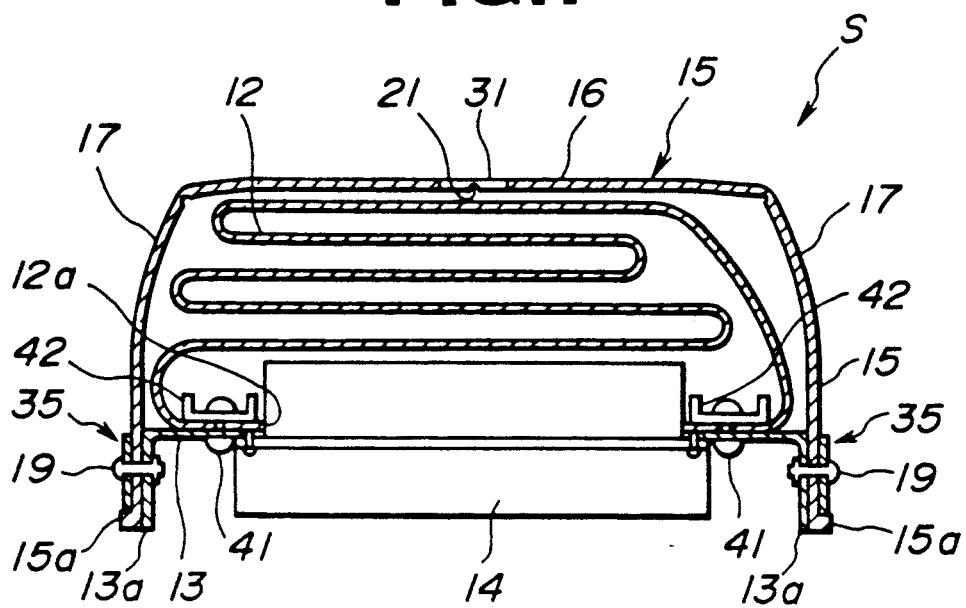
FIG. 1 is a cross-sectional view of an embodiment of an airbag restraint system according to the present invention.
Figure 2:
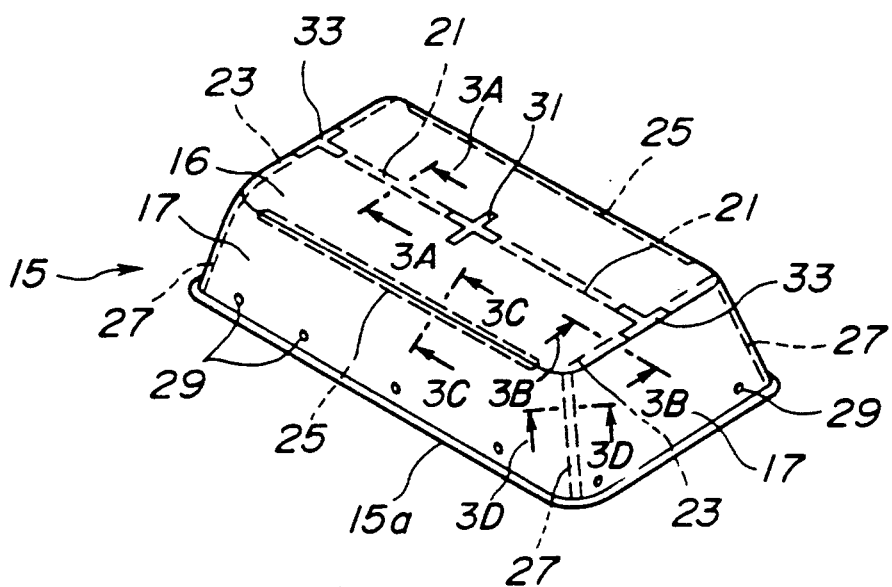
FIG. 2 is a perspective view of a cover member used in the airbag restraint system of FIG. 1.
Figure 3A:
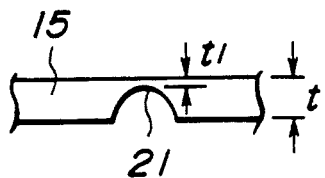
FIG. 3A is an enlarged cross-sectional view of the cover member taken in the direction of arrows substantially along the line 3a—3a of FIG. 2.
Figure 3B:
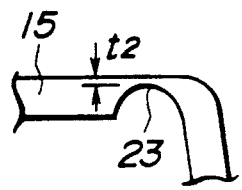
FIG. 3B is an enlarged cross-sectional view of the cover member taken in the direction of arrows substantially along the line 3b—3b of FIG. 2.
Figure 3C:
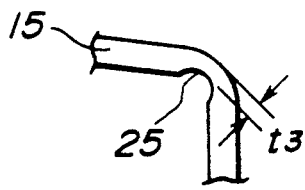
FIG. 3C is an enlarged cross-sectional view of the cover member taken in the direction of arrows substantially along the line 3c—3c of FIG. 2.
Figure 3D:
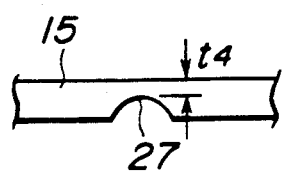
FIG. 3D is an enlarged cross-sectional view of the cover member taken in the direction of arrows substantially along the line 3d—3d of FIG. 2.
Figure 4:
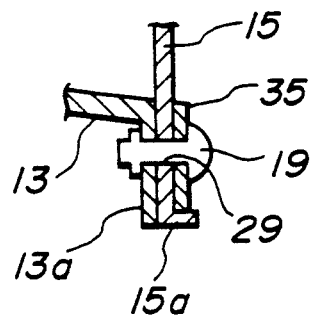
FIG. 4 is a perspective view showing a state of the cover member in the event of the inflation of the airbag shown in FIG. 1.

Referring now to FIGS. 1 to 5, there is shown an embodiment of an airbag restraint system S in accordance with the present invention. The airbag restraint system S of this embodiment is for an automotive vehicle and comprises an airbag 12 which has a gas intake passage (no numeral) through which gas from a gas generator 14 is supplied to the airbag 12 so as to momentarily inflate the airbag 12 in a event of the vehicle serious collision. The airbag 12 is secured at its end portion 12a to a base plate 13 with rivets 41 through retainers 42. The base plate 13 is fixedly connected to a part of a vehicle body (not shown) such as an instrument panel or steering. The airbag 12 is folded and is covered with a cover member 15 for preventing the airbag 12 from being injured by the contact with the vehicular body and the like.

The cover member 15 is formed in a generally box shape with a cover base 17 of a surrounding wall portion and a cover top 16 of a top portion. The cover member 15 is fixed at its end peripheral portion to the end portion 13a of the base plate 13 with a plurality of rivets 19 through a reinforcing plate 35. The cover member 15 has first, second, third, and fourth portions 21, 23, 25, and 27 whose thicknesses are thinner than that of a main portion of the cover member 15.

The first thin portion 21 is formed at the center portion of the cover top 16 to equally divide into two parts in the longitudinal direction of the cover top 16. A pair of second thin portions 23 are formed at the connecting portion of the cover top 16 and the cover base 17 to be perpendicular to the first thin portion 21. In other words, the second thin portion 23 is formed at a portion just close to and along the short side of said cover top 16. A pair of third thin portions 25 are formed at the connecting portion of the cover top 16 and the cover base 17 to be parallel with the first thin portion 21. In other words, the third thin portion 25 is formed at a portion just close to and along the long side of the cover top 16. The fourth thin portion 27 is formed at each corner of the cover base 17 to extend to the end of the second thin portion 23.

A cross shaped opening 31 is formed at a center position of the first thin portion 21 so that the cover top 16 is quickly and easily broken in the event of the inflation of the airbag 12. A pair of T-shaped openings 33 are formed at a portion where the first thin portion 21 and the second thin portion 23 cross with each other so as to be opposite to each other. The first thin portion 21 and the second thin portion 23 start to be broken at the position defining the T-shaped opening 33 in the event of the inflation of the airbag 12, so that the cover member 15 is easily broken along the first and second thin portions 21 and 23. The cross-shaped opening 31 and T-shaped opening 33 are covered with a silicon resin or sealing patch (not shown) in order to protect foreign materials from getting into the inside space of the cover member 15.

A cross-sectional view of the first, second, third, and fourth thin portions 21, 23, 25, and 27 are shown in FIGS. 3A to 3D, respectively. The thickness $t_1$ of the first thin portion 21 is thinner than the thickness $t_4$ of the fourth thin portion 27 so that the cover member 15 is prevented from being deformed in the process of the plastic molding. The thickness $t_1$ of the first thin portion 21 and the thickness $t_4$ of the second thin portion 27 are formed to be thinner than $\frac{1}{2}$ of the main thickness t of the main portion of the cover member 15 so that the first and fourth thin portions 21 and 27 are easily broken by the inflation of the airbag 12. The thickness $t_2$ of the second thin portion 23 is similar to that of the first thin portion 21. The thickness $t_3$ of the third thin portion 25 is defined so that the cover top 16 of the cover member 15 is easily bent in the event of the inflation of the airbag 12. For example, when the thickness t of the main portion of the cover member 15 is 3 mm, it is preferable that the thickness $t_1$ and $t_2$ are 0.2-0.3 mm, the thickness $t_3$ is 1.5-2 mm, and the thickness $t_4$ is about 1.5 mm. As clearly shown in FIGS. 3A to 3D, these thin portions 21, 23, 25, and 27 are formed on the inner surface of the cover member 15 in such a manner that depressions (or grooves) having a U-shaped cross-section are formed on the inner surface of the cover member 15.

The peripheral end portion 15a of the cover member 15 is formed to be bent outwardly in order to prevent the cover member 15 from being deformed in the step of the plastic molding. Furthermore, in order to improve the strength at the installation section for the rivets 19, a reinforcing plate 35 is attached on the cover member 15 to sandwich the cover member 15 with the base plate 13.

Figure 5:
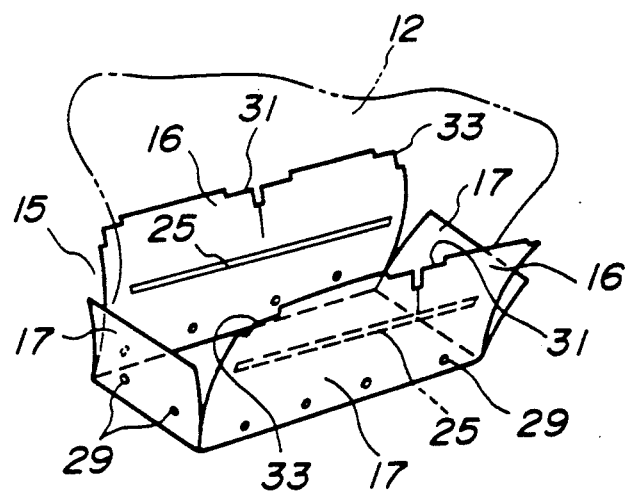
FIG. 5 is an enlarged cross-sectional view of a connecting portion of the cover member of FIG. 1.

With the thus arranged airbag restrain system S, since the openings 31 and 33 are formed at the center portion of the cover top 16 and the center portion of the short side of the cover top 16, the cover member 15 is easily broken by splitting from the opening defining portion in the event of the inflation of the airbag, as shown in FIG. 5. Accordingly, without increasing the number of the rivets, the cover member 15 is easily broken from the cover top 16 and is prevented from being broken at the installation portion of the cover member 15. Thus, this airbag restraint system S according to the present invention provides an excellent safety for a vehicle passenger.

Furthermore, since the thickness of the first thin portion 21 is thinner than that of the fourth thin portion 27, the cover member 15 is smoothly produced by the plastic molding without being deformed in the ejecting process of the molding. This largely improves the efficiency of the working operation in production.

While the thin portions 21, 23, 25, and 27 have been shown and described as being formed straight at the inner surface of the cover member 15, it will be understood that the thin portions may be formed intermittently and/or at the outer surface of the cover member 15.

What is claimed is:

1. An airbag restraint system, comprising:
   a base plate;
   a gas generator secured to said base plate;
   an airbag secured to said base plate and fluidly connected with said gas generator so as to be supplied with gas from said gas generator; and
   a cover member covering said airbag when said airbag is folded, said cover member being formed in a generally box shape and having a cover top of a rectangular plate and a surrounding wall portion having a plurality of corners, said surrounding wall portion being a cover base, said cover member being secured at its peripheral portion to said base plate, said cover member having a first opening at a central portion of the cover top, a second opening at a center portion of a short side of the cover top, a first thin portion at a center portion of the cover top which divides the cover top into two equal parts, a second thin portion at a portion of the cover top proximate to the short side of the cover top, and a third thin portion at a part of the cover top proximate to a long side of the cover top; and
   a plurality of fourth thin portions;
   wherein each of the plurality of corners includes a respective one of the plurality of fourth thin portions which each extend from a top end of the respective corner to a bottom end of the respective corner, a thickness of the first thin portion is the same as a thickness of the second thin portion, and the thicknesses of said first and second thin portions are thinner than a thickness of the fourth thin portion.

2. An airbag restraint system as claimed in claim 1, wherein the second opening is formed in a T-shape at a portion where the first thin portion and the second thin portion cross.

3. An airbag restraint system as claimed in claim 1, wherein said base plate is fixed to a vehicle body of an automotive vehicle.

4. A cover member for covering a folded airbag, the airbag being installed in an automotive vehicle and being inflated for protecting a vehicle passenger in the event of a serious collision, said cover member comprising:
- a cover top formed of a rectangular plate;
- a cover base formed generally in a tube shape having a rectangular cross-section and a plurality of corners, one end of said cover base being integrally connected to each side of said cover top, the other end of said cover base being secured to a vehicle body of the automotive vehicle;
- a first thin portion at a center portion of the cover top which divides the cover top into two equal parts;
- a second thin portion at a part of the cover top proximate to a short side of the cover top:
- a third thin portion at a portion of the cover top proximate to a long side of the cover top; and
- a plurality of fourth thin portions;
- wherein each of the plurality of corners includes a respective one of the plurality of fourth thin portions which each extend from a top end of the respective corner to a bottom end of the respective corner, a thickness of the first thin portion is the same as a thickness of the second thin portion, and the thicknesses of said first and second thin portions are thinner than a thickness of the fourth thin portion;
- wherein the cover top has a first opening at a center portion thereof and a second opening at a center portion of the short side of said cover top.

5. A cover member for covering a folded airbag, the airbag being installed in an automotive vehicle and being inflated for protecting a vehicle passenger in the event of a serious collision, said cover member comprising:
- a cover top formed of a rectangular plate;
- a cover base formed generally in a tube shape having a rectangular cross-section and a plurality of corners, one end of said cover base being integrally connected to each side of said cover top, the other end of said cover base being secured to a vehicle body of the automotive vehicle;
- a first thin portion formed at a center portion of said cover top which divides said cover top into two equal parts;
- a second thin portion formed at a portion of the cover top proximate to and along a short side of said cover top
- a third thin portion formed at a proximate to and along a long side of said cover top; and
- a plurality of fourth thin portions;
- wherein each of the plurality of corners includes a respective one of the plurality of fourth thin portions which each extend from a top end of the respective corner to a bottom end of the respective corner, a thickness of the first thin portion is the same as a thickness of the second thin portion, and the thicknesses of said first and second thin portions are thinner than a thickness of the fourth thin portion;
- wherein said cover member has a cross-shaped opening at a center position of said first thin portion, and a T-shaped opening at a portion of the cover member where said first and second thin portions cross with each other.

6. An airbag restraint system as claimed in claim 1, wherein the first opening is formed at a center position of the first thin portion, and the second opening is formed at a portion of the cover member where the first thin portion and the second thin portion cross with each other.

7. An airbag restraint system, comprising:
- a base plate;
- a gas generator secured to said base plate;
- an airbag secured to said base plate and fluidly connected with said gas generator so as to be supplied with gas from said gas generator; and
- a cover member covering said airbag when said airbag is folded, said cover member being formed in a generally box shape and having a cover top of a rectangular plate and a surrounding wall portion including a plurality of corners, said cover member being secured at its peripheral portion to said base plate, said cover member having a first opening at the central portion of the cover top, a second opening at a center portion of a short side of the cover top, a first thin portion at a center portion of the cover top which divides the cover top into two equal parts, a second thin portion at a portion of the cover top proximate to the short side of the cover top, a third thin portion at a part of the cover top proximate to a long side of the cover top; and
- a plurality of fourth thin portions;
- wherein each of the plurality of corners includes a respective one of the plurality of fourth thin portions which each extend from a top end of the respective corner to a bottom end of the respective corner, a thickness of the first thin portion is the same as a thickness of the second thin portion, and the thicknesses of said first and second thin portions are thinner than a thickness of the fourth thin portion;
- wherein said cover top is solid except for said first and second openings.

8. A cover member as claimed in claim 4, wherein said second thin portion is formed along the short side of said cover top and said third thin portion is formed along the long side of said cover top.

9. A cover member for an airbag, said cover member comprising:
- a cover top being a rectangular plate and having top and bottom surfaces, a long side and a short side, said cover top having a first opening at a central portion thereof and a second opening at a center portion of said short side; and
- a cover base including a plurality of corners and being secured to said cover top;
- wherein
- a first recessed portion is located in one of said top and bottom surfaces, said first recessed portion dividing said one of said top and bottom surfaces in which it is located into two equal parts and defining a first reduced thickness in said cover top;
- a second recessed portion is located in one of said top and bottom surfaces at a part of said cover top which is proximate to said short side, said second recessed portion defining a second reduced thickness in said cover top;
- a third recessed portion is located in one of said top and bottom surfaces proximate to said long side of said cover top, said third recessed portion defining a third reduced thickness in said cover top; and
- a plurality of fourth recessed portions each defining a reduced thickness in said cover base;
- wherein each of the plurality of corners includes a respective one of the plurality of fourth recessed portions which each extend from a top end of the respective corner to a bottom end of the respective corner, a thickness of the first recessed portion is the same as a thickness of the second recessed portion, and the thickness of said first and second recessed portions is thinner than a thickness of the fourth recessed portion;

wherein when the airbag is inflated, the cover top is broken at said first and second openings and completely along said first, second, and fourth recessed portions due to said thickness of said first recessed portion, said thickness of said second recessed portion and the thinner thicknesses of said fourth recessed portions, respectively, and said cover top is bent along said third recessed portion due to said third reduced thickness.

10. An airbag restraint system as claimed in claim 1, wherein the thickness of the fourth thin portion is thinner than one half of a main thickness of the cover member.

* * * * *